United States Patent [19]

Anderson

[11] Patent Number: 5,414,598
[45] Date of Patent: May 9, 1995

[54] LIGHT WEDGE FOR DISTRIBUTING LIGHT ACROSS A DISPLAY DEVICE

[75] Inventor: Clifford L. H. Anderson, Lake Worth, Fla.

[73] Assignee: Motorola Inc., Schaumburg, Ill.

[21] Appl. No.: 259,112

[22] Filed: Jun. 13, 1994

Related U.S. Application Data

[63] Continuation of Ser. No. 939,768, Sep. 2, 1992, abandoned.

[51] Int. Cl.$^6$ ............................................. G01D 11/28
[52] U.S. Cl. ......................................... 362/26; 362/31
[58] Field of Search ....................... 340/815.31, 815.15, 340/815.17, 815.4, 815.42, 815.49; 362/26, 27, 31; 40/546, 582, 549

[56] References Cited

U.S. PATENT DOCUMENTS

| | | | |
|---|---|---|---|
| 4,151,582 | 4/1979 | Grunberger | 362/31 |
| 4,218,726 | 8/1980 | Fukasawa et al. | 362/26 |
| 4,630,895 | 12/1986 | Abdala, Jr. et al. | |
| 4,929,062 | 5/1990 | Guzik et al. | |
| 4,933,814 | 6/1990 | Sanai | 362/26 |
| 4,954,930 | 9/1990 | Maegawa et al. | 362/31 |
| 5,075,824 | 12/1991 | Tan | |

FOREIGN PATENT DOCUMENTS 0943929  3/1974  Canada .................................. 362/31

OTHER PUBLICATIONS

Motorola Technical Publication, entitled "Low–Profile LCD Retainer/Mount and Lightpipe", by Roshitsh, published by Motorola, Inc., Oct. 1990.

Motorola Technical Publication, entitled "Light Pipe With Integral Alert Lens", by Dill et al., published by Motorola, Inc., Oct., 1990.

"Parts That Glow", by Blumenfeld et al., reprinted from Machine Design, Oct. 29, 1959.

Perez, Richard A., "Electronic Display Devices", published by TAB Professional and Reference Books, Blue Ridge Summit, Pa., 1988, pp. 270-295.

Primary Examiner—Alvin E. Oberley
Assistant Examiner—Chanh Nguyen
Attorney, Agent, or Firm—Kelly A. Gardner; John H. Moore

[57] ABSTRACT

A light wedge (300) formed from light conducting material comprises a first surface (308) for receiving light rays from a light emitting source (515), the first surface (308) having a first axial length, and a second surface (310) substantially opposite the first surface (308) and having a second axial length. The light wedge (300) additionally comprises two side surfaces (315, 320) further bounding the light conducting material between the first surface (308) and the second surface (310) and a plurality of sidewalls (325, 330, 333) positioned about an axis substantially parallel to a line of symmetry between the two side surfaces (315, 320), the plurality of sidewalls (325, 330, 333) forming a cavity within the light conducting material, wherein the plurality of sidewalls (325, 330, 333) receives and distributes a first portion of the light rays through the light conducting material.

23 Claims, 2 Drawing Sheets

LIGHT WEDGE FOR DISTRIBUTING LIGHT ACROSS A DISPLAY DEVICE

This is a continuation of application Ser. No. 07/939,768, filed Sep. 2, 1992, now abandoned.

FIELD OF THE INVENTION

This invention relates in general to the illumination of display devices, and more specifically to a light wedge for backlighting a display device.

BACKGROUND OF THE INVENTION

Many electronic devices, such as pagers, employ display devices to present information to a user. One such display device that is well known in the art is a liquid crystal display (LCD), which typically displays graphics and alphanumeric characters. The characters are often, however, illegible when the user is in an area that has insufficient lighting. Therefore, a light source is generally mounted behind the LCD so as to illuminate the LCD from within the electronic device.

One conventional method for backlighting an LCD involves the use of an electro-luminescent (EL) panel, which is mounted directly behind the LCD. Typically, an EL panel is constructed from a layer of phosphorous material, on either side of which electrodes are disposed. When a voltage is applied across the electrodes, the EL panel emits a uniformly distributed light by which the LCD is illuminated. The required voltage, however, is typically very high, and, in conventional pagers, step-up circuitry, consisting of at least a transformer, is required to increase the voltage supplied by a battery to the voltage required by the EL panel. The use of an EL panel, therefore, increases the current drain on the battery, thus decreasing the battery life. This decrease in battery life is often unacceptable, as in the case of most pagers which utilize small batteries having low capacities. Furthermore, the commonly large size of the transformer restricts the use of the EL panel in pagers having strict space constraints. In addition to the above mentioned drawbacks, an EL panel is typically very expensive when compared to the cost of other electronic components. The use of an EL panel to illuminate an LCD is, therefore, unsuitable for many conventional pagers.

A further method for backlighting an LCD involves the use of a light wedge, which guides light from one or more light sources, e.g., light emitting diodes (LEDs) or incandescent lamps, to a region behind the LCD. In pagers employing a light wedge, a light source is typically mounted within the pager, and the light wedge is secured between the light source and the LCD. The light wedge is constructed from a translucent material and formed such that light beams emanating from the light source are received by the light wedge and guided, mainly by reflection, towards the LCD. Additionally, a diffuse material typically applied to one of the reflective surfaces of the light wedge further diffuses a portion of the guided light beams. In this manner, the LCD is illuminated from behind by both diffused and direct light supplied by the light source.

Conventionally, the use of a light wedge is much less expensive than the use of an EL panel. Additionally, the combination of a light wedge and light sources typically requires less space than an EL panel and step-up circuitry. Typical light wedges, however, do not commonly provide uniformly distributed light to an LCD. Furthermore, most typical light wedges allow light to pass directly to some regions of the LCD. As a result, "hot spots", brightly lit areas which reveal the location of the light sources, and dim areas, which appear shadowed in comparison to the hot spots, are visible on the surface of the LCD. To overcome this problem, other typical light wedges employ additional light sources to illuminate the dim areas. This solution, however, merely creates a greater number of hot spots if the supplied light is not uniformly distributed. The use of additional light sources also introduces a number of unnecessary and sometimes expensive parts into the design of the electronic device. Therefore, although the light wedge is normally less expensive than an EL panel, the resulting illumination is often poor enough so that the LCD is difficult to read unless additional light sources are utilized.

Thus, what is needed is an improved light wedge which provides a more uniform distribution of light to eliminate hot spots. Furthermore, the light wedge should not require more than a single light source.

SUMMARY OF THE INVENTION

A light wedge formed from light conducting material includes a first surface for receiving light rays from a light emitting source. The first surface has a first axial length. A second surface substantially opposite the first surface has a second axial length. Two side surfaces further bound the light conducting material between the first surface and the second surface, and a plurality of sidewalls are positioned about an axis substantially parallel to a line of symmetry between the two side surfaces.

The plurality of sidewalls form a cavity within the light conducting material. Additionally, the plurality of sidewalls receives first and second portions of the light rays emanating through a central region of the light conducting material and distributes the first portion of the light rays away from the central region to outer regions of the light conducting material on either side of the cavity. The plurality of sidewalls directs the second portion of the light rays through the cavity and through the central region of the light conducting material.

DESCRIPTION OF A PREFERRED EMBODIMENT

In many typical electronic devices utilizing displays, such as liquid crystal displays (LCDs), to present information to a user, the display is illuminated such that the user may read the displayed information even in dimly lit areas. The illumination of the display is often accomplished through use of a light wedge, which directs light from one or more light emitting sources, such as light emitting diodes (LEDs) or incandescent lamps, to a region behind the display. Thus, the light provided by the lamps backlights the LCD.

Figure 1:
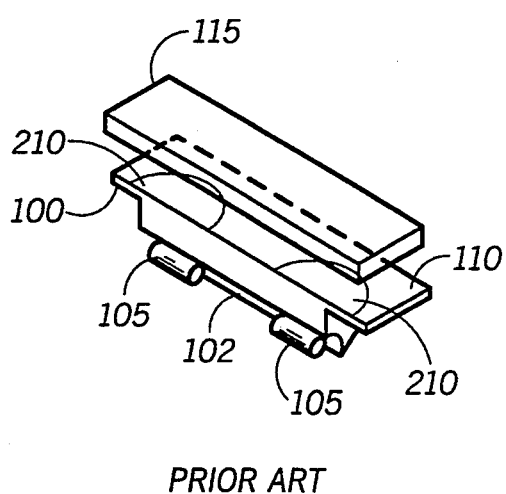
FIG. 1 is a perspective view of a conventional light wedge.

One such conventional light wedge 100, which is formed from a light conducting material such as polycarbonate or acrylic, is depicted in FIG. 1. As shown, a curved light receiving surface 102 of the light wedge 100 receives light from two lamps 105 adjacent to the light receiving surface 102. The light wedge 100 is employed to guide the received light to a light emitting surface 110, which transmits the light to an LCD 115. In this manner, light emanating from the lamps 105 is directed through the light wedge 100 to backlight the LCD 115, as may be better understood by referring to FIG. 2.

Figure 2:
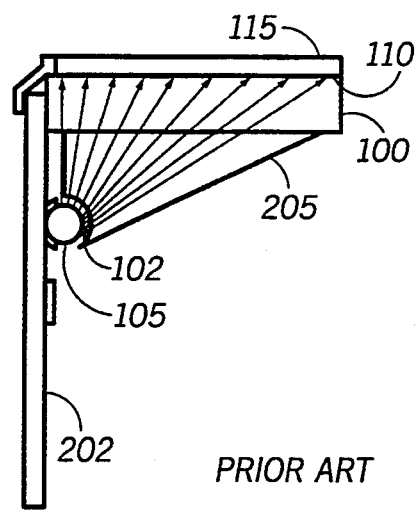
FIG. 2 is a side view of the conventional light wedge of FIG. 1.

FIG. 2, which is a side view of the conventional light wedge 100, illustrates the passage of light rays through the light wedge 100. The light wedge 100 is positioned adjacent to the lamps 105, which are mounted on a printed circuit board 202, such that the light receiving surface 102 partially surrounds the lamps 105. The light rays emanating from the lamps are received by the light receiving surface 102 and transmitted through the light conducting material. As shown, a large majority of the received light rays are transmitted through the light conducting material directly to the light emitting surface 110 of the light wedge 100. Other received light rays are transmitted through the light conducting material and received by an angled surface 205. The angled surface 205 is usually textured or painted with a diffusely reflective ink to provide a diffuse surface, thereby diffusing the light rays received by the angled surface 205. These diffused light rays are again transmitted through the light conducting material to the light emitting surface 110 of the light wedge 100. The light rays are transmitted through the light emitting surface 110 to the LCD 115, thus backlighting the LCD 115.

However, the light wedge 100, like other conventional light wedges, does not uniformly illuminate the LCD 115, mainly because the majority of the light rays emanating from the lamps 105 travel directly through the light emitting surface 110 to areas of the LCD 115 located above the lamps 105. Therefore, only a small amount of light rays, those diffused by the angled surface 205, are employed to indirectly light the remaining areas of the LCD. As a result, brightly lit areas, referred to as "hot spots" 210 (FIG. 1), which reveal the location of the lamps 105 are formed on the surface of the LCD 115. In comparison, dim areas surrounding the hot spots appear shadowed, thereby making the LCD 115 difficult to read in some circumstances.

Figure 3:
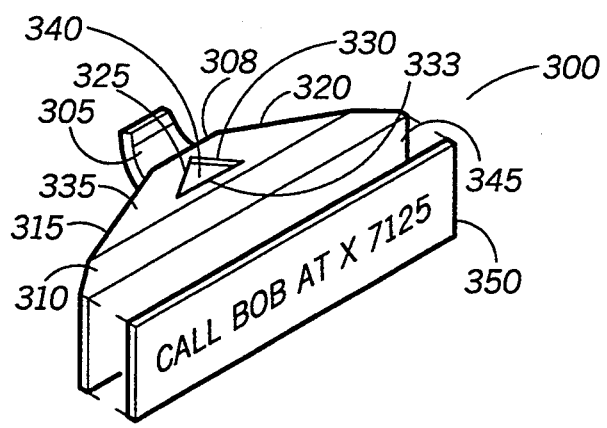
FIG. 3 is a perspective view of a light wedge in accordance with a preferred embodiment of the present invention.

FIG. 3 is a perspective view of a light wedge 300, in accordance with a preferred embodiment of the present invention, which is formed from a light conducting material, such as polycarbonate or acrylic. The light wedge 300 includes polished surfaces which define a light receiving pocket 305. Preferably, a first surface 308 of the light receiving pocket 305 has an axial length of 0.84 cm, although this dimension may vary with the size of light emitting source, such as an incandescent lamp or a light emitting diode (LED), that is to be disposed within the light receiving pocket 305. The received light is directed, primarily by the first surface 308, through the light conducting material of the light wedge 300 towards a second surface 310, which is opposite the first surface 308. The second surface 310 is formed at an angle with respect to the first surface 308, as will be described in greater detail below.

The light conducting material of the light wedge 300 is further bounded by polished side surfaces 315, 320 between the first surface 308 and the second surface 310. Preferably, a first 315 of the polished side surfaces 315, 320 is formed at an angle of approximately 20° with respect to the first surface 308, and a second 320 of the polished side surfaces 315, 320 is formed at an angle of approximately 160° with respect to the first surface 308. In accordance with the preferred embodiment of the present invention, adjoining polished sidewalls 325, 330, positioned, as shown, about a central line of symmetry between the polished side surfaces 315, 320, are formed in the light conducting material. Preferably, a first 325 of the sidewalls 325, 330 is formed at an angle of approximately 45° with respect to the first surface 308, and a second 330 of the sidewalls 325, 330 is formed at an angle of approximately 135° with respect to the first surface 308. A third polished sidewall 333, substantially parallel to the first surface 308 and ideally having a length of 0.76 cm, connects the sidewalls 325, 330 to define a cavity in a top surface 335 of the light wedge 300. A lower cavity surface 340, which limits the depth of the cavity to approximately 0.10 cm, is preferably textured. In accordance with the preferred embodiment of the present invention, the remaining light conducting material beneath the lower cavity surface 340 allows a small portion of light rays received from the light emitting source to pass directly through a central region of the light wedge 300, whereas the sidewalls 325, 330 redirect a larger portion of light rays to outer regions of the light wedge 300. Therefore, the combination of the light conducting material beneath the lower cavity surface 340 and the sidewalls 325, 330 contribute to the distribution of light rays throughout the light wedge 300.

According to the present invention, the light conducting material is further bounded by a light diffusing surface, the operation of which is described below, and a light emitting surface 345 located substantially opposite the light diffusing surface. The light emitting surface 345 transmits light, originating from the light emitting source, to a liquid crystal display (LCD) 350 which is preferably located adjacent to the light emitting surface 345. Ideally, the dimensions of the length and width of the light emitting surface 345 are approximately equivalent to the dimensions of the length and width of the LCD 350. In accordance with the preferred embodiment of the present invention, the LCD 350 displays information which may be illuminated by light transmitted through the light wedge 300, thus enabling a user to read the displayed information in a variety of lighting conditions. Furthermore, the light wedge 300 illuminates the LCD 350 through utilization of only a single light emitting source, thereby avoiding the further costs associated with the use of additional light emitting sources.

Figure 4:
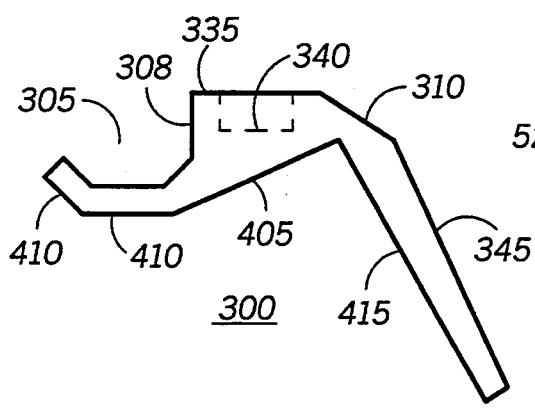
FIG. 4 is a side view of the light wedge of FIG. 3 in accordance with the preferred embodiment of the present invention.

FIG. 4 is a side view of the light wedge 300. As described above, the light received by the light receiving pocket 305 is directed through the light conducting material of the light wedge 300 to the second surface 310, primarily by reflection from the polished sidewalls 325, 330, the side surfaces 315, 320, and a polished back surface 405, which is formed between outer surfaces 410 of the light receiving pocket 305 and the light diffusing surface 415.

Figure 5:
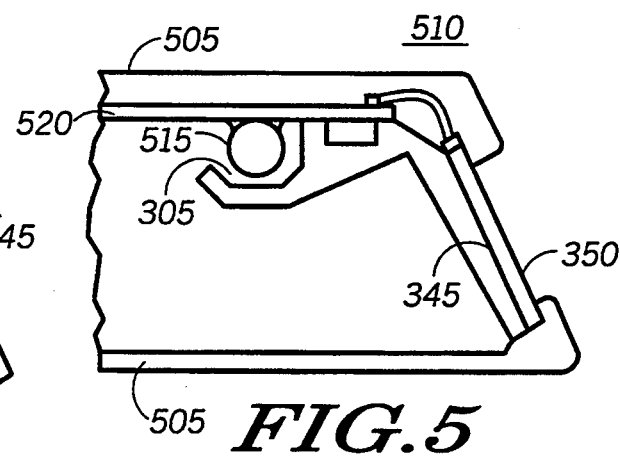
FIG. 5 is a side view of an electronic device utilizing the light wedge of FIG. 3 to direct light from a light emitting source to a display device, thereby illuminating the display device from behind in accordance with the preferred embodiment of the present invention.

As can be seen by referring to FIG. 5, when situated within a housing 505 of an electronic device 510, the light receiving pocket 305 partially surrounds an incandescent lamp 515 mounted on a printed circuit board 520. When positioned correctly, the light emitting surface 345 of the light wedge 300 is located adjacent to the LCD 350, which presents information to a user. In operation, the light wedge 300 receives, via the light receiving pocket 305, light emanating from the lamp 515 and guides the received light through the light conducting material to the light emitting surface 345, thereby illuminating the LCD 350 from behind. In accordance with the preferred embodiment of the present invention, the light wedge 300 uniformly distributes, in a manner described below, the light received from the lamp 515. Therefore, additional lamps, which may often be needed in conventional light wedges, are unnecessary when the present light wedge 300 is utilized by the electronic device 510. As a result, use of the light wedge 300 eliminates the costs, such as component, stocking, and manufacturing costs, associated with the use of extra parts in the design of the electronic device 510.

Figure 6:
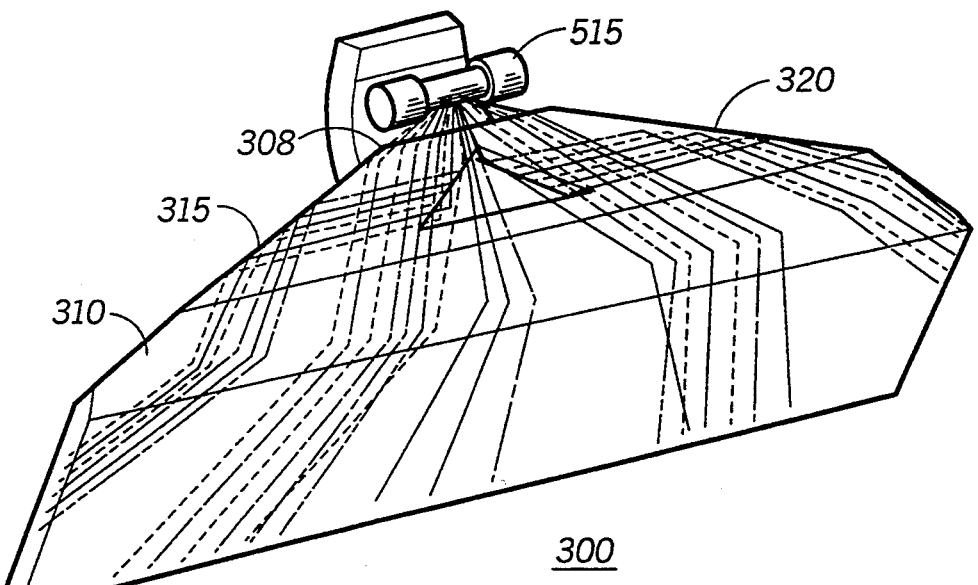
FIG. 6 is a light ray diagram, shown in a perspective view, of the light wedge of FIG. 3 in accordance with the preferred embodiment of the present invention.

FIG. 6 is a light ray diagram, shown from a perspective view, of the light wedge 300. From this diagram, it can be seen that a first portion of the light rays emanating from the lamp 515 are received by the angled sidewalls 325, 330 (FIG. 3). Because the sidewalls 325, 330 are polished, the large majority of the light rays received by the sidewalls 325, 330 are reflected towards the polished side surfaces 315, 320, which further reflect the light rays. The angles at which the side surfaces 315, 320 are formed, i.e., 20° and 160°, are such that the light rays are redirected mainly towards outer areas of the second surface 310, which, in electronic devices utilizing conventional light wedges, usually remain shadowed. A small amount of the light rays received by the sidewalls 325, 330 is passed through the cavity defined by the sidewalls 325, 330, 333 (FIG. 3), returned to the light conducting material, and directed towards a central region of the second surface 310.

A second portion of the light rays emanating from the lamp 515 travel through areas of the light conducting material surrounding the cavity defined by the sidewalls 325, 330, 333. A first quantity of these light rays, as shown, are directed through the light conducting material on either side of the sidewalls 325, 330 to the second surface 310. In this manner, the first quantity of light rays, in addition to the majority of the first portion of the light rays, as described above, are directed towards the outer regions, which, in many typical light wedges, would remain shadowed. A second quantity of the light rays included in the second portion of the light rays are directed through the light conducting material between the lower cavity surface 340 (FIG. 4) and the bottom surface 405, and are thereby allowed to pass through the central region of the light wedge 300. Therefore, light supplied by the lamp 515 is distributed throughout the light wedge 300 and not concentrated in the central region closest to the lamp. As a result, many of the hot spots and shadowed areas associated with typical light wedges are eliminated because the light wedge 300 spreads the supplied light throughout the light conducting material.

Figure 7:
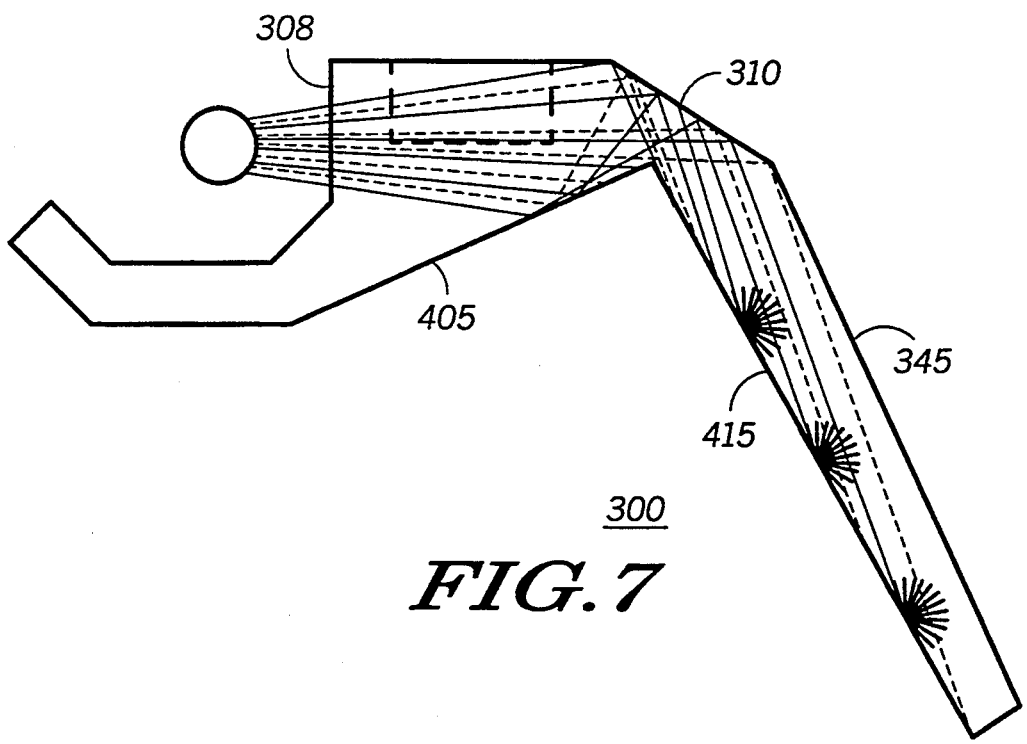
FIG. 7 is a light ray diagram, shown in a side view, of the light wedge of FIG. 3 in accordance with the preferred embodiment of the present invention.

FIG. 7 is a light ray diagram, shown from a side view, of the light wedge 300. As described above, many of the light rays received by the first surface 308 are directed towards the sidewalls 325, 330 (FIG. 3). Other light rays, however, travel through the light conducting material surrounding the cavity defined by the sidewalls 325, 330, 333. A portion of these other light rays, rather than traveling on either side of the cavity, travel through the light conducting material between the lower cavity surface 340 (FIG. 4) and the bottom surface 405 and are reflected by the bottom surface 405 towards the second surface 310.

In accordance with the preferred embodiment of the present invention, the second surface 310 is formed at an angle of approximately 56° with respect to the first surface 308 and an angle of approximately 29° with respect to the light diffusing surface 415. Therefore, light rays received by the second surface 310, which is ideally polished, are redirected towards the light diffusing surface 415. The light diffusing surface 415 is preferably highly textured or painted with a diffusely reflective ink to provide a diffuse surface. As a result, the light rays reflected by the second surface 415 are received and diffused by the light diffusing surface 415. These diffused light rays are received by the light emitting surface 345 and transmitted to the adjacent LCD 350 (FIG. 5). In this manner, all of the light rays that are employed to illuminate the LCD 350 have been distributed throughout the light wedge 300 and diffused by the light diffusing surface 415, thereby eliminating hot spots and dim areas resulting from insufficient light distribution.

In summary, the light wedge in accordance with the preferred embodiment of the present invention uniformly distributes light supplied by a single light emitting source. The light wedge further transmits the uniformly distributed light to a region behind a liquid crystal display (LCD), thereby illuminating information displayed by the LCD. According to the present invention, the uniform distribution of light rays emanating from the light emitting source is accomplished in part by utilizing a cavity formed in the light wedge to spread the light rays to various areas of the light wedge. More specifically, the cavity redirects a large portion of the light rays from a central region of the light wedge towards outer regions of the light wedge. Additionally, an angled surface, referred to as the second surface, bounding the light conducting material of the light wedge reflects the uniformly distributed light rays such that they are redirected to a light diffusing surface of the light wedge. In this manner, no light rays are able to travel directly through the light emitting surface to the LCD. Instead, all light rays used to illuminate the LCD are first reflected to numerous areas, including outer regions, of the light diffusing surface and then are diffused before reaching the LCD. Therefore, hot spots and dim areas, normally present on LCDs illuminated by conventional light wedges, are eliminated, resulting in the uniform distribution of light provided to the LCD.

By now it may be appreciated that there has been provided an improved light wedge which provides a more uniform distribution of light to eliminate hot spots. Furthermore, the light wedge requires only a single light emitting source.

I claim:

1. A light wedge formed from light conducting material, comprising:
   a first surface for receiving light rays from a light emitting source, the first surface having a first axial length;
   a second surface substantially opposite the first surface and having a second axial length;
   two side surfaces further bounding the light conducting material between the first surface and the second surface; and
   a plurality of sidewalls positioned about an axis substantially parallel to a line of symmetry between the two side surfaces, the plurality of sidewalls forming a cavity within the light conducting material, wherein the plurality of sidewalls receives first and second portions of the light rays emanating through a central region of the light conducting material and distributes the first portion of the light rays away from the central region to outer regions of the light conducting material on either side of the cavity, and wherein the plurality of sidewalls directs the second portion of the light rays through the cavity and through the central region of the light conducting material.

2. The light wedge in accordance with claim 1, further comprising a lower cavity surface bounding the cavity and the light conducting material, wherein the lower cavity surface is substantially normal to and connects the plurality of sidewalls, thereby limiting the depth of the cavity, and wherein a third portion of the light rays emanating through the central region is directed through the central region of the light conducting material beneath the lower cavity surface.

3. The light wedge in accordance with claim 2, wherein the first surface directs a fourth portion of the light rays through the light conducting material surrounding the cavity towards the second surface.

4. The light wedge in accordance with claim 1, wherein:
   a first sidewall included in the plurality of sidewalls is formed at a first angle with respect to the first surface, wherein the first sidewall reflects a first quantity of the light rays, included in the first portion of the light rays, through the light conducting material such that the first quantity of the light rays is directed away from the central region of the light conducting material and towards a first side surface of the two side surfaces;
   a second sidewall included in the plurality of sidewalls is formed at a second angle with respect to the first surface, wherein the second sidewall reflects a second quantity of the light rays, included in the first portion of the light rays, through the light conducting material such that the second quantity of the light rays is directed away from the central region of the light conducting material and towards a second side surface of the two side surfaces;
   the first side surface receives the first quantity of the light rays and reflects the first quantity of the light rays through the light conducting material such that the first quantity of the light rays is redirected towards the second surface; and
   the second side surface receives the second quantity of the light rays and reflects the second quantity of the light rays through the light conducting material such that the second quantity of the light rays is redirected towards the second surface.

5. The light wedge in accordance with claim 4, wherein:
   the first angle at which the first sidewall is formed is substantially 45°; and
   the second angle at which the second sidewall is formed is substantially 135°.

6. The light wedge in accordance with claim 5, wherein the first sidewall adjoins the second sidewall such that the first and second sidewalls each receive substantially half of the first portion of the light rays emitted by the light emitting source.

7. The light wedge in accordance with claim 4, wherein:
   the first side surface is formed at a third angle with respect to the first surface, wherein the third angle is substantially 20°; and
   the second side surface is formed at a fourth angle with respect to the first surface, wherein the fourth angle is substantially 160°.

8. The light wedge in accordance with claim 4, wherein the first and second sidewalls join to form a radius that receives and distributes the second portion of the light rays through the cavity and through the central region.

9. The light wedge in accordance with claim 8, further comprising:
   a light diffusing surface further bounding the light conducting material and having a third axial length substantially equivalent to the second axial length, wherein the second surface reflects and redirects light rays received by the second surface through the light conducting material towards the light diffusing surface, and wherein the light diffusing surface receives and diffuses the light rays reflected by the second surface; and
   a light emitting surface located substantially opposite the light diffusing surface for receiving and emitting the diffused light rays.

10. A display unit for illuminating displayed information, comprising:
   a display device for displaying the information;
   a light emitting source for providing light by which the information displayed by the display device is illuminated; and
   a light wedge positioned between the light emitting source and the display device for directing the light from the light emitting source to the display device such that the display device is backlighted, wherein the light wedge is formed from a light conducting material, the light wedge comprising:
      a first surface for receiving light rays from the light emitting source, the first surface having a first axial length;
      a second surface substantially opposite the first surface and having a second axial length;
      two side surfaces further bounding the light conducting material between the first surface and the second surface;
      a plurality of sidewalls positioned about an axis substantially parallel to a line of symmetry between the two side surfaces, the plurality of sidewalls forming a cavity within the light conducting material, wherein the plurality of sidewalls receives first and second portions of the light rays emanating through a central region of the light conducting material and distributes the first portion of the light rays away from the central region to outer regions of the light conducting material towards the two side surfaces on either side of the cavity, wherein the plurality of sidewalls directs the second portion of the light rays through the cavity and through the central region of the light conducting material towards the second surface, and wherein the two side surfaces receive the first portion of the light rays and direct the first portion of the light rays towards the second surface;

a lower cavity surface bounding the cavity and the light conducting material, wherein the lower cavity surface is substantially normal to and connects the plurality of sidewalls, thereby limiting the depth of the cavity, wherein a third portion of the light rays emanating through the central region is directed through the central region of the light conducting material beneath the lower cavity surface towards the second surface;

a light diffusing surface further bounding the light conducting material and having a third axial length substantially equivalent to the second axial length, wherein the second surface reflects and redirects light rays received by the second surface through the light conducting material towards the light diffusing surface, and wherein the light diffusing surface receives and diffuses the light rays reflected by the second surface; and a light emitting surface located substantially opposite the light diffusing surface and adjacent to the display device, wherein the light emitting surface receives the diffused light rays and transmits the diffused light rays such that the display device is illuminated.

11. The display unit in accordance with claim 10, wherein:

a first sidewall included in the plurality of sidewalls is formed at a first angle with respect to the first surface, wherein the first sidewall reflects a first quantity of the light rays, included in the first portion of the light rays, through the light conducting material such that the first quantity of the light rays is directed away from the central region of the light conducting material and towards a first side surface of the two side surfaces;

a second sidewall included in the plurality of sidewalls is formed at a second angle with respect to the first surface, wherein the second sidewall reflects a second quantity of the light rays, included in the first portion of the light rays, through the light conducting material such that the second quantity of the light rays is directed away from the central region of the light conducting material and towards a second side surface of the two side surfaces;

the first side surface receives the first quantity of the light rays and reflects the first quantity of the light rays through the light conducting material such that the first quantity of the light rays is redirected towards the second surface; and the second side surface receives the second quantity of the light rays and reflects the second quantity of the light rays through the light conducting material such that the second quantity of the light rays is redirected towards the second surface.

12. The display unit in accordance with claim 11, wherein:

the first angle at which the first sidewall is formed is substantially 45°; and the second angle at which the second sidewall is formed is substantially 135°.

13. The display unit in accordance with claim 11, wherein:

the first side surface is formed at a third angle with respect to the first surface, wherein the third angle is substantially 20°; and the second side surface is formed at a fourth angle with respect to the first surface, wherein the fourth angle is substantially 160°.

14. The display unit in accordance with claim 12, wherein the first sidewall adjoins the second sidewall such that the first and second sidewalls each receive substantially half of the first portion of the light rays emitted by the light emitting source.

15. An electronic device, comprising:

a printed circuit board;

a display device coupled to the printed circuit board for displaying messages;

a light emitting source mounted on the printed circuit board for providing light by which the messages displayed by the display device are illuminated;

a light wedge positioned between the light emitting source and the display device for directing the light from the light emitting source to the display device such that the display device is backlighted, wherein the light wedge is formed from a light conducting material, the light wedge comprising:

a first surface for receiving light rays from the light emitting source, the first surface having a first axial length;

a second surface substantially opposite the first surface and having a second axial length;

two side surfaces further bounding the light conducting material between the first surface and the second surface;

a plurality of sidewalls positioned about an axis substantially parallel to a line of symmetry between the two side surfaces, the plurality of sidewalls forming a cavity within the light conducting material, wherein the plurality of sidewalls receives first and second portions of the light rays emanating through a central region of the light conducting material and distributes the first portion of the light rays away from the central region to outer regions of the light conducting material towards the two side surfaces on either side of the cavity, wherein the plurality of sidewalls directs the second portion of the light rays through the cavity and through the central region of the light conducting material towards the second surface, and wherein the two side surfaces receive the first portion of the light rays and direct the first portion of the light rays towards the second surface;

a lower cavity surface bounding the cavity and the light conducting material, wherein the lower cavity surface is substantially normal to and connects the plurality of sidewalls, thereby limiting the depth. Of the cavity, wherein a third portion of the light rays emanating through the central region is directed through the central region of the light conducting material beneath the lower cavity surface towards the second surface;

a light diffusing surface further bounding the light conducting material and having a third axial length substantially equivalent to the second axial length, wherein the second surface reflects and redirects light rays received by the second surface through the light conducting material towards the light diffusing surface, and wherein the light diffusing surface receives and diffuses the light rays reflected by the second surface; and a light emitting surface located substantially opposite the light diffusing surface and adjacent to the display device, wherein the light emitting surface receives the diffused light rays and transmits the diffused light rays such that the display device is illuminated; and a housing for enclosing the printed circuit board, the display device, and the light wedge.

16. The electronic device in accordance with claim 15, wherein:

a first sidewall included in the plurality of sidewalls is formed at a first angle with respect to the first surface, wherein the first sidewall reflects a first quantity of the light rays, included in the first portion of the light rays, through the light conducting material such that the first quantity of the light rays is directed away from the central region and towards a first side surface of the two side surfaces;

a second sidewall included in the plurality of sidewalls is formed at a second angle with respect to the first surface, wherein the second sidewall reflects a second quantity of the light rays, included in the first portion of the light rays, through the light conducting material such that the second quantity of the light rays is directed away from the central region and towards a second side surface of the two side surfaces;

the first side surface receives the first quantity of the light rays and reflects the first quantity of the light rays through the light conducting material such that the first quantity of the light rays is redirected towards the second surface; and the second side surface receives the second quantity of the light rays and reflects the second quantity of the light rays through the light conducting material such that the second quantity of the light rays is redirected towards the second surface.

17. The electronic device in accordance with claim 16, wherein:

the first angle at which the first sidewall is formed is substantially 45°; and the second angle at which the second sidewall is formed is substantially 135°.

18. The electronic device in accordance with claim 16, wherein:

the first side surface is formed at a third angle with respect to the first surface, wherein the third angle is substantially 20°; and the second side surface is formed at a fourth angle with respect to the first surface, wherein the fourth angle is substantially 160°.

19. The electronic device in accordance with claim 17, wherein the first sidewall adjoins the second sidewall such that the first and second sidewalls each receive substantially half of the first portion of the light rays emitted by the light emitting source.

20. A light wedge for receiving light rays from a single light source for illuminating a display device, the light wedge comprising:

light receiving means for receiving the light rays from the single light source and for directing them through light conducting material partially bounded by the light receiving means, wherein a majority of the light rays are directed through a central region of the light conducting material;

light dividing means formed in the central region for directing a first portion of the majority of the light rays away from the central region towards outer regions of the light conducting material on either side of the light dividing means and for allowing a second portion of the majority of the light rays to pass through the light dividing means and through the central region;

light redirecting means further bounding the light conducting material for receiving the first portion of the majority of the light rays directed through the outer regions and the second portion of the majority of the light rays directed through the central region and for redirecting both the first and second portions towards diffusing means for diffusing the first and second portions for subsequent direction towards the display device.

21. The light wedge in accordance with claim 9, wherein the light wedge is shaped such that no rays of light emitted by the light emitting source are provided directly to the light diffusing surface or the light emitting surface.

22. The display unit in accordance with claim 10, wherein the light wedge is shaped such that no rays of light emitted by the light emitting source are provided directly to the light diffusing surface or the light emitting surface.

23. The electronic device in accordance with claim 15, wherein the light wedge is shaped such that no rays of light emitted by the light emitting source are provided directly to the light diffusing surface or the light emitting surface.

* * * * *